United States Patent [19]

Tamura et al.

[11] Patent Number: 4,805,977
[45] Date of Patent: Feb. 21, 1989

[54] OPTICAL COUPLER FOR OPTICAL DIRECT AMPLIFIER

[75] Inventors: Yasuaki Tamura; Kiyofumi Mochizuki, both of Tokyo, Japan

[73] Assignees: Oki Electric Industry Co., Ltd; Kokusai Denshin Denwa Co., Ltd., both of Tokyo, Japan

[21] Appl. No.: 115,769

[22] Filed: Nov. 2, 1987

[30] Foreign Application Priority Data

Nov. 4, 1986 [JP] Japan .................................. 61-260598

[51] Int. Cl.⁴ ................................................ G02B 6/28
[52] U.S. Cl. ............................. 350/96.16; 350/96.29; 370/1
[58] Field of Search ............... 350/96.15, 96.16, 96.29; 370/1, 3

[56] References Cited

U.S. PATENT DOCUMENTS

| | | | |
|---|---|---|---|
| 4,401,364 | 8/1983 | Mochizuki | 350/96.15 X |
| 4,560,246 | 12/1985 | Cotter | 350/96.16 |
| 4,595,284 | 6/1986 | Tatekura et al. | 356/73.1 |
| 4,616,898 | 10/1986 | Hicks, Jr. | 350/96.30 X |

OTHER PUBLICATIONS

Ohashi et al., Raman Amplification Characteristics, Etc., No. 1113 of 1985 Gen. Mtg. in the Elec. and Comm. Inst. of Japan Aoki et al., Noise Characteristics of Fiber Raman, Etc., No. 1115 of 1985 Gen. Mtg. in the Elec. and Comm. Inst. of Japan.

Primary Examiner—John D. Lee
Assistant Examiner—Phan T. Heartney
Attorney, Agent, or Firm—Martin M. Novack

[57] ABSTRACT

A high power pump light source for optical direct amplifier using the stimulated Raman effect is obtained by using a plurality of semiconductor lasers each of which provides low output power. More than two beams of the same wavelength generated by semiconductor lasers are combined (polarization multiplex) by using a polarization prism block, which provides sufficient high power pump light for the stimulated Raman effect amplifier. The output of said polarization prism block is wavelength division multiplexed with signal light to be amplified by using an interference filter block, the output of which is applied to a transmission optical fiber in which amplification of said signal light is effected.

6 Claims, 6 Drawing Sheets

10

OPTICAL COUPLER FOR OPTICAL DIRECT AMPLIFIER

BACKGROUND OF THE INVENTION

The present invention relates to an optical coupler, which is used as an optical source of an optical direct amplifier using the stimulated Raman scatter effect in an optical fiber.

The Raman effect is the phenomenon that when light of the angular frequency ($\Omega$) illuminates a material, another light of the angular frequency ($\Omega \pm \Delta\Omega$) is generated depending upon the transition of the transmition of the vibration state and/or the spin state of the material. The light of ($\Omega - \Delta\Omega$) is called stokes light, and the light of ($\Omega + \Delta\Delta$) is called anti-stokes light.

When a strong laser beam of the angular frequency ($\Omega$) is input to a material, the stokes light of ($\Omega - \Omega$) is generated through the Raman effect, and the vibration of the frequency ($\Delta\Omega$) is generated by the beat between the input beam and the stokes beam. The generated beam triggers another stokes beam, and beat. The stimulated Raman scatter is generated by above process.

An optical direct amplification is carried out by the using the stimulated Raman scatter phenomenon by non-linear effect of an optical fiber. For instance, such an amplifier is reported in No.1115, 4-239 and No.1113, 4-237 in the annual meeting in 1985 of the Institute of Electronics and Communication in Japan.

FIG. 7 shows a prior optical direct amplifier using stimulated Raman scatter effect. In the figure, the numeral 71 is a pump light source, 72 is a light combiner (multiplexer), 73 is a wavelength separator, 74 is an optical fiber for pump light, 75 is an optical fiber for signal, and 76 is an optical fiber for transmission (Raman effect).

In the figure, the pump light in the optical fiber 74 is combined with the signal light in the optical fiber 75. Then, the combined light is transmitted in the optical fiber 76, where the signal light is amplified by the stimulated Raman effect. The wavelength separator 73 separates only the desired wavelength as an amplified output signal.

In the optical direct amplifier using the stimulated Raman effect as shown in FIG. 7, the pump wavelength is selected so that the stokes wavelength generated by the pump wavelength is almost the same as the wavelength of the signal to be amplified. Therefore, a high power pump light source 71 and an optical coupler 72 for coupling both pump light and signal light to a common optical fiber are essential.

Conventionally, a pump light source 71 is a solid laser like a YAG laser. And, an optical combiner 72 for combining a pump light with a signal light is implemented by a half mirror.

By the way, it has been known that silica based optical fiber has small attenuation in the wavelength 1.3 $\mu$m and 1.5 $\mu$m. In order to amplify those wavelengths, the preferable wavelengths of the pump light source are 1.2 $\mu$m and 1.4 $\mu$m, respectively.

However, a conventional solid laser, like YAG laser and/or $E_r$ laser can generate only 1.06 $\mu$m or 1.55 $\mu$m, which is unfortunately different from said preferable wavelength. Further, those solid lasers (YAG laser and $E_r$ laser) has the disadvantage that the size is large and the operation is not easy.

A semiconductor laser which generates said preferable wavelength is now available in the commercial market. A semiconductor laser is small in size as compared with a solid laser, and it is easy to operate and the wavelength is adjustable. However, a semiconductor laser has the disadvantage that the output power is insufficient for a pump light source 71.

The apparatus of FIG. 7 has another disadvantage that the combiner 72 which is implemented by a half mirror has relatively large optical attenuation, since a half mirror reflects a part of pump light and signal light.

SUMMARY OF THE INVENTION

It is an object, therefore, of the present invention to overcome the disadvantage and limitation of a prior optical source for an optical direct amplifier by providing a new and improved optical coupler.

It is also an object of the present invention to provide an optical coupler which provides a high power optical beam for an optical direct amplifier with the desired wavelength.

It is also an object of the present invention to provide an optical coupler for an optical direct amplifier in which both pump light and signal light are combined into a common optical fiber with small attenuation.

The above and other objects are attained by an optical coupler for an optical direct amplifier using stimulated Raman effect in which pump light is wavelength multiplexed with signal light and multiplexed light is applied to transmission optical fiber, comprising; a polarization prism for combining two linear polarization beams with the same wavelength as each other generated by semiconductor lasers; a wavelength multiplexer optically coupled directly with said polarization prism so that output of said polarization prism is wavelength multiplexed with signal light and an output of said wavelength multiplexer being applied to a transmission optical fiber.

BRIEF DESCRIPTION OF THE DRAWINGS

The foregoing and other objects, features, and attendant advantages of the present invention will be understood by means of the following description and accompanying drawings wherein.

DESCRIPTION OF THE PREFERRED EMBODIMENTS

Figure 1:
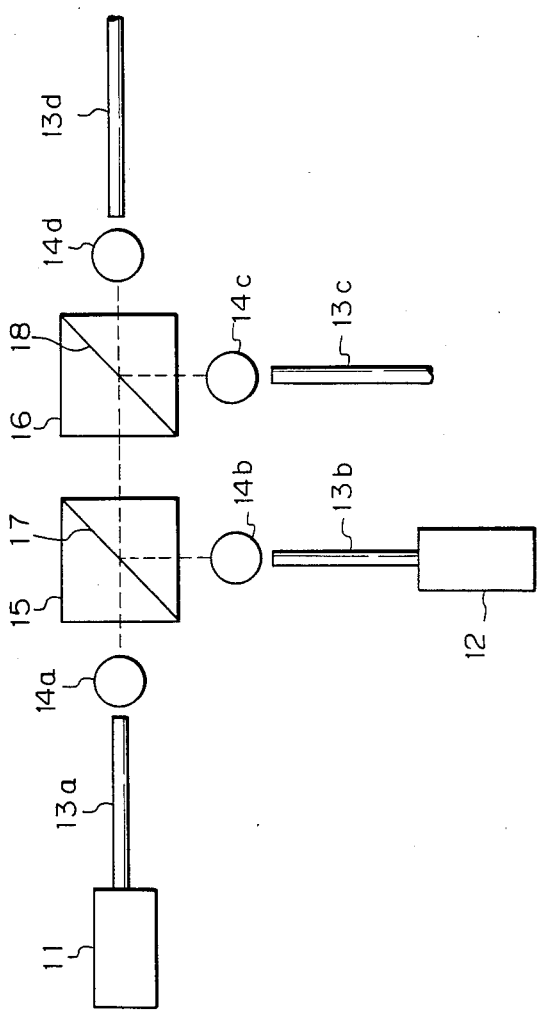
FIG. 1 shows a structure of an optical coupler according to the present invention.

FIG. 1 shows the first embodiment of the present invention, which is used in an optical direct amplifier using stimulated Raman effect. In the figure, the numerals 11 and 12 are respectively the first semiconductor laser diode module and the second semiconductor laser diode module for optical source. Those two modules provide the same wavelength as each other. The numerals 13a and 13b are polarization maintaining optical fibers located at the outputs of said laser modules 11 and 12, respectively, for accepting light from the laser modules 11 and 12. A pair of collimating lenses 14a and 14b are located at the outputs of said optical fibers 13a and 13b, respectively, for collimating the optical beams. The polarization prism block 15 combines (polarization combination) the beams from the collimating lenses 14a and 14b in coherent condition, and provides a pump output light.

The numeral 13c is an optical fiber for signal light to be amplified. The collimating lens 14c is located at the output of the optical fiber 13c to collimate the output beam of the optical fiber 13c.

The interference filter block 16 effects the wavelength multiplex combination of the pump beam from the polarization prism block 15 and the signal light from the collimating lens 14c. The collimating lens 14d and the transmission optical fiber 13d are provided at the output of the interference filter block 16. The numeral 17 is the boundary plane of the polarization prism block 15, and the numeral 18 is the interference filter plane of the interference filter block 16.

The output beam of the first semiconductor laser diode module 11 applied to the collimating lens 14a through the optical fiber 13a is converted to a parallel beam by the collimating lens 14a, and is applied to the transmission optical fiber 13d through the polarization prism block 15, the interference filter block 16 and the collimating lens 14d. It is assumed that the polarization plane of the above beam is P state wave, in which the polarization plane is parallel to the plane 17 of the polarization prism block 15. On the other hand, the output beam of the second semiconductor laser diode module 12 through the optical fiber 13b and the collimating lens 14b is reflected by the boundary plane 17 of the polarization prism block 15, and then, that beam is applied to the transmission optical fiber 13d through the block 16 and the collimating lens 14d. The beam in this case is assumed to be S state wave which is perpendicular to the plane 17. The signal light is interposed with the pump beam in the interference filter block 16 simply using the fact that the wavelength band of the signal light differs from that of the pump light (for instance, the wavelength shift of a silica based optical fiber is about 425 $cm^{-1}$ in wave numbers).

In the first embodiment of FIG. 1, the high power pump beam is obtained since two semiconductor lasers are used, and the same wavelength beams of those lasers are combined by a polarization prism block. Further, the high power pump beam is directly multiplexed with signal light which is to be amplified by using an interference filter (wavelength multiplex combiner) without using an intermediate lens and an intermediate optical fiber.

Furthermore, it should be noted that the interference filter block is optically coupled directly with the polarization prism block, without using an optical fiber and/or a collimating lens. So, optical attenuation between those two blocks does not occur.

Therefore, the coupling loss is very small.

In one embodiment, two semiconductor lasers with output power of 100 mW each are used. The optical power of each laser when the light is introduced into an optical fiber is about 50 mW, and two lights of 50 mW are combined to provide 100 mW, which is enough for stimulated Raman effect.

Figure 2:
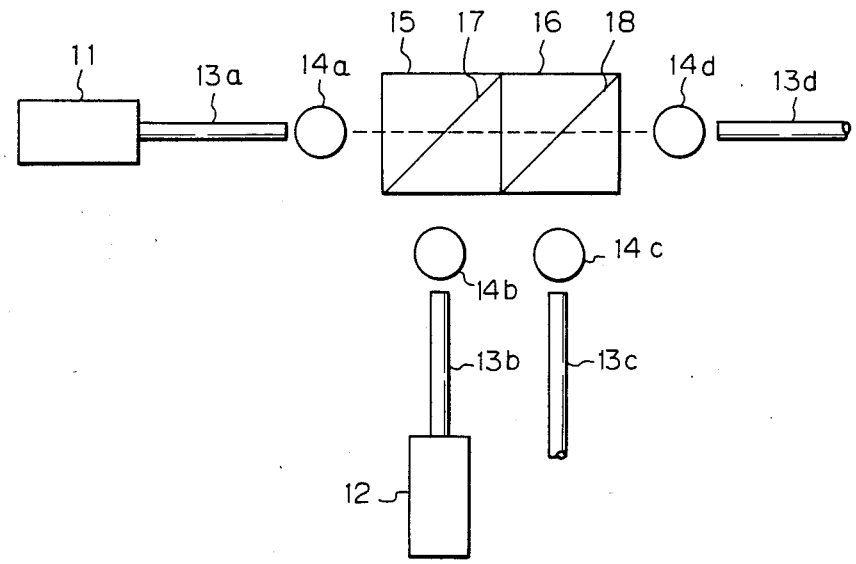
FIG. 2 shows a structure of another embodiment of an optical coupler according to the present invention.

FIG. 2 shows the second embodiment of the present invention. The feature of FIG. 2 is that the polarization prism block 15 is attached directly to the interference filter block 16 by using transparent optical contact adhesive. The embodiment of FIG. 2 has the advantage that the optical loss is smaller than that of the embodiment of FIG. 1, which has spacing between two blocks.

Figure 3:
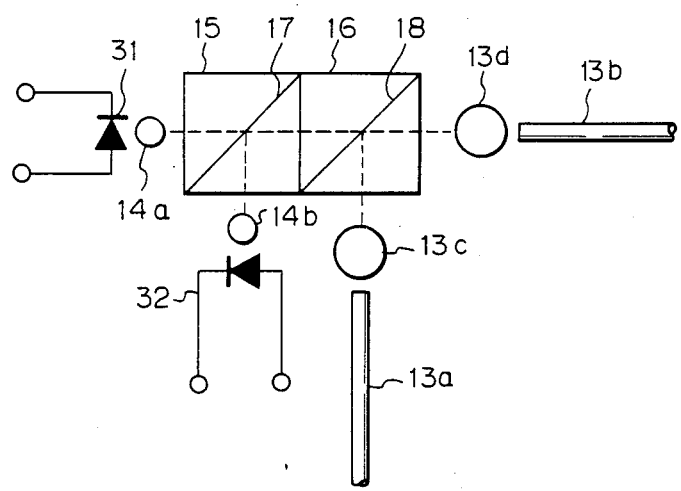
FIG. 3 shows a structure of still another embodiment of the present optical coupler.

FIG. 3 shows the third embodiment of the present optical coupler. The feature of that embodiment is that the semiconductor lasers 31 and 32 are directly coupled with the collimating lenses 14a and 14b, respectively, without using the optical fibers 13a and 13b of FIG. 1. The polarization prism block 15 is directly coupled with the interference filter block 16 as is the case of FIG. 2. The embodiment of FIG. 3 has the advantage that the optical loss is smaller than that of the previous embodiments.

Figure 4:
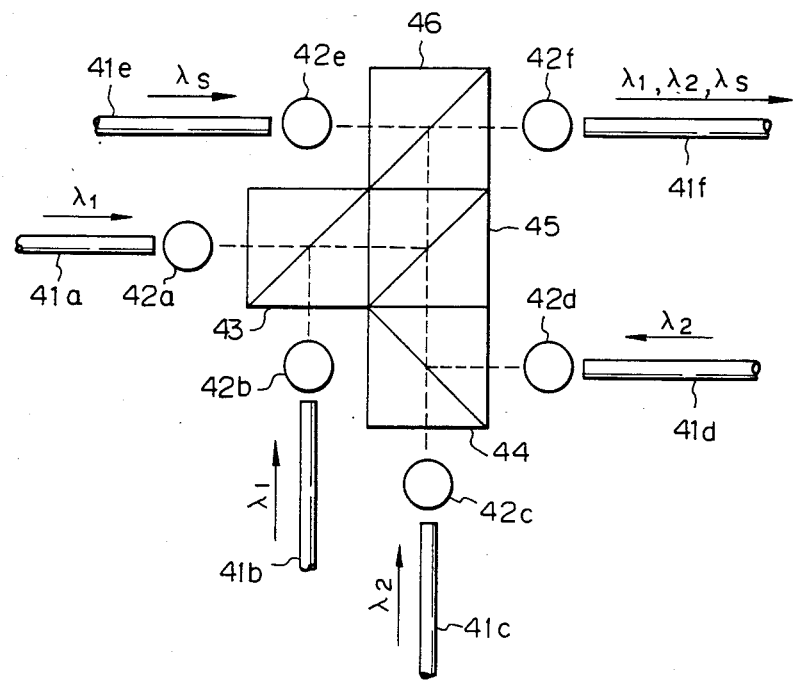
FIG. 4 shows a structure of still another embodiment of the present optical coupler.

FIG. 4 shows the fourth embodiment of the present optical coupler. In the figure, two polarization prism blocks 43 and 44 are coupled with two interference filter blocks 45 and 46, as shown in the figure. The two linear polarization beams in the optical fibers 41a and 41b having the same wavelength ($\gamma_1$) as each other are applied to the polarization prism block 43 with the polarizations perpendicular, and are combined. The combined beam is reflected by the interference filter block 45 which transmits only the wavelength ($\gamma_2$) and reflects other wavelengths, and is further reflected by the other interference filter block 46 which transmits only the wavelength ($\gamma_s$) and reflects other wavelengths. The output of the interference filter block 46 is applied to the transmission optical fiber 41f through the collimating lens 42f.

Similarly, the beams generated by other semiconductor lasers (not shown) coupled with the optical fibers 41c and 41d having the wavelength ($\gamma_2$) and the linear polarization are applied to the polarization prism block 44 through the collimating lenses 42d c and 42d, and are combined. Then, the combined beam transmits the interference filter block 45, and the output of the block 45 is reflected by the interference filter block 46 the output of which is coupled with the transmission optical fiber 41f through the collimating lens 42f.

Furthermore, the signal light having the wavelength ($\gamma_s$) in the optical fiber 41e is transmitted through the interference filter block 46 and is coupled with the transmission optical fiber 41f through the collimating lens 42f.

Therefore, all the linear polarization beams through the optical fibers 41a, 41b, 41c, 41d and 41e are coupled with the transmission optical fiber 41f with no attenuation theoretically.

It should be noted that the wavelength of the pump light with respect to the wavelength of signal light to be amplified is not severe in an amplifier using stimulated Raman effect, but some error of wavelength of pump light is allowable. Therefore, a pump wavelength does not need to be a single wavelength, but a plurality of close wavelengths are possible.

FIG. 4 uses the above fact. The wavelength ($\gamma_1$) from the optical fibers 41a and 41b are combined (polarization multiplex) in the polarization prism block 43, and the lights of the wavelength in the optical fibers 41c and 41d are combined in the polarization prism block 44. The outputs of two polarization prism blocks 43 and 44 are wavelengths multiplexed in the interference filter block 45, which provides the final strong pump light. The above members (43, 44, 45) comprise a pump light source.

The signal light in the optical fiber 41e with the wavelength ($\gamma_s$) is wavelength multiplexed with the wavelengths ($\gamma_1$ and $\gamma_2$) in the interference filter block 46, the output of which is coupled with the transmission optical fiber 41f.

The embodiment of FIG. 4 has the advantage that the higher pump light with small loss is obtained.

In one embodiment of FIG. 4, the first wavelength ($\gamma_1$) is 1440 nm, the second wavelength ($\gamma_2$) is 1460 nm, and the wavelength of the signal light is 1550 nm.

Figure 5:
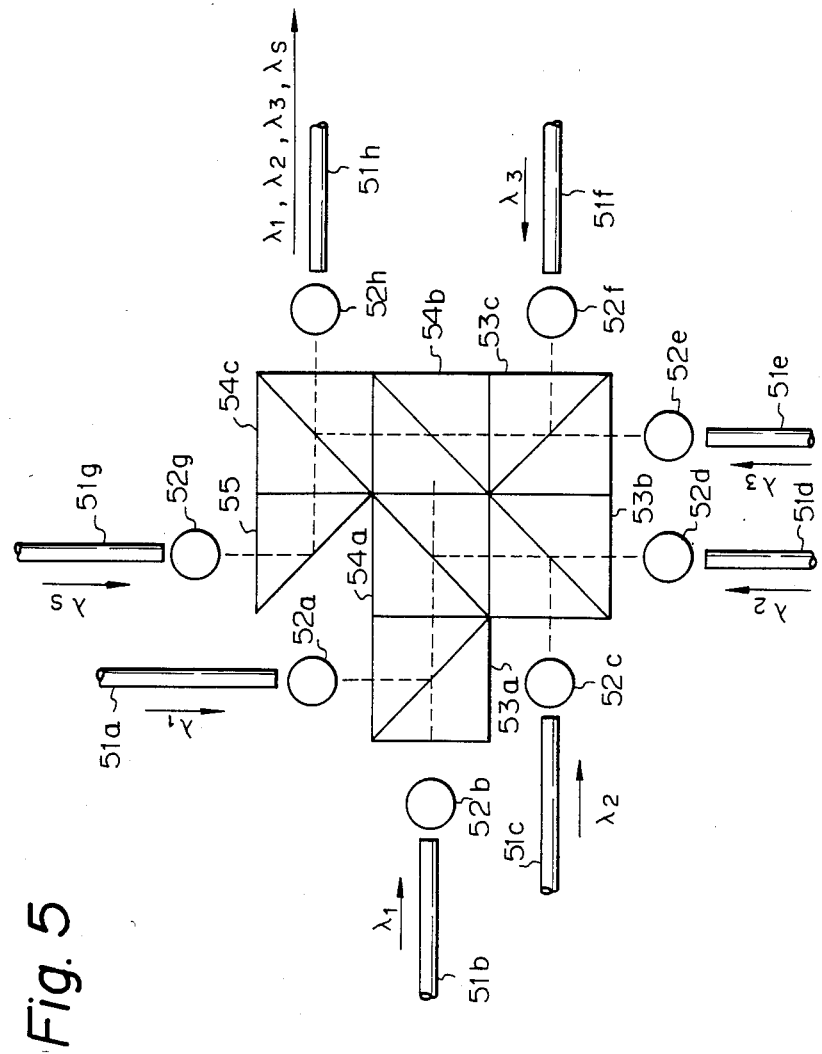
FIG. 5 shows a structure of still another embodiment of the present optical coupler.

FIG. 5 shows the modification of the embodiment of FIG. 4. The feature of FIG. 5 is that three close wavelengths ($\gamma_1$, $\gamma_2$ and $\gamma_3$) are combined (polarization multiplex) to provide a pump light source. Therefore, three polarization prism blocks 53a, 53b, and 53c, three interference filter blocks 54a, 54b and 54c, and a prism 55 are provided. Those members are attached directly with one another by using transparent optical contact adhesive. The numerals 51a through 51h are optical fibers, 52a through 52h are collimating lenses, 53a through 53c are polarization prism blocks, 54a through 54c are interference filter blocks.

Figure 6:
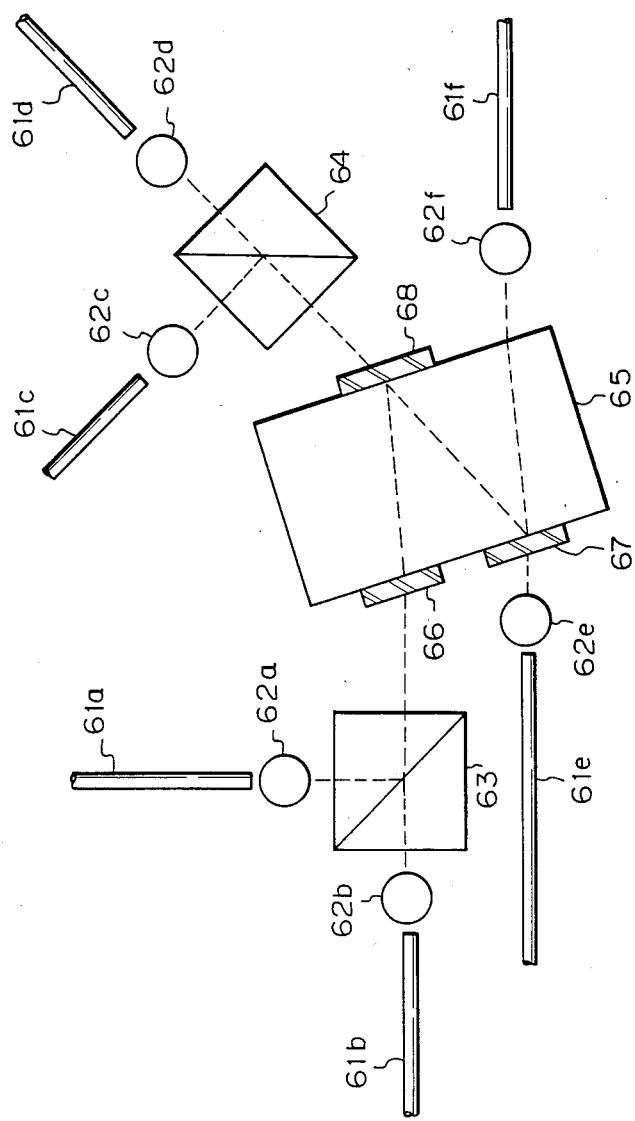
FIG. 6 shows a structure of still another embodiment of the present optical coupler.
Figure 7:
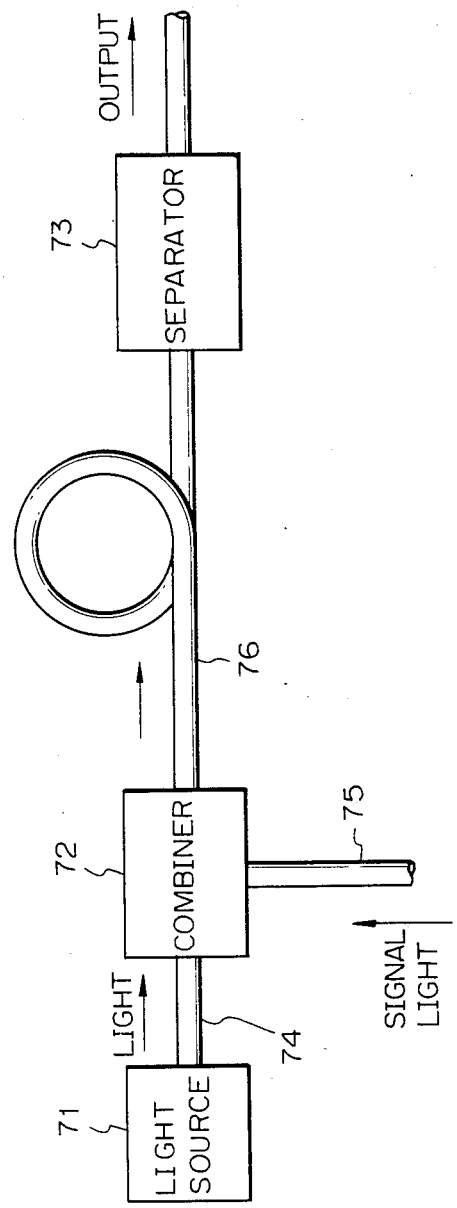
FIG. 7 shows a prior optical direct amplification system using the stimulated Raman scatter effect.

FIG. 6 shows still another embodiment of the present invention, which is a modification of the embodiment of FIG. 4. The feature of FIG. 6 is that the polarization prism blocks are separated from the interference filter blocks to allow freedom of the design of the apparatus. Therefore, the polarization prisms 63 and 64 are separated from the interference filter block 65 as shown in the figure. The interference filter block 65 is provided with the interference filters 66, 67, and 68. In the figure, the numerals 61a through 61d are optical fibers, 61e is an optical fiber for signal light, 61f is a transmission optical fiber, 62a through 62f are collimating lenses.

As mentioned above, according to the present invention, two linear polarization beams with the same wavelength as each other are combined (polarization multiplex) by using a polarization prism block. Therefore, high power pump light source is obtained even when low power semiconductor lasers are used. Furthermore, the pump light beam is directly combined with signal light to be amplified without using a lens and/or an optical fiber. Therefore, the coupling loss is small.

Additionally, as all the members including a polarization prism block and an interference filter block are mounted in a single housing, the size of the apparatus may be small, and the operation of the apparatus is simple.

Also, when more than two close wavelengths are combined, the higher pump light source is obtained as well. From the foregoing it will now be apparent that a new and improved optical coupler has been discovered. It should be understood of course that the embodiments disclosed are merely illustrative and are not intended to limit the scope of the invention. Reference should be made to the appended claims, therefore, rather than the specification as indicating the scope of the invention.

What is claimed is:

1. An optical coupler for an optical direct amplifier using stimulated Raman effect in which pump light is wavelength multiplexed with signal light and multiplexed light is applied to a transmission optical fiber, comprising;

a polarization multiplex prim for multiplexing two linear polarization beams with the same wavelength and perpendicular polarization planes generated by semiconductor lasers, and for providing a single output multiplexed beam, a wavelength multiplexer optically coupled with said single output multiplexed beam of said polarization multiplex prism so that the output of said polarization multiplex prism is wavelength division multiplexed with signal light, and the output of said wavelength multiplexer being applied to a single transmission optical fiber.

2. An optical coupler according to claim 1, wherein the wavelength of said semiconductor lasers is 1.2 $\mu$m, and the wavelength of signal light is 1.3 $\mu$m.

3. An optical coupler according to claim 1, wherein the wavelength of said semiconductor lasers is 1.4 $\mu$m, and wavelength of signal light is 1.5 $\mu$m.

4. An optical coupler according to claim 1, wherein said polarization prism is directly coupled with said wavelength multiplexer.

5. An optical coupler according a claim 1, wherein said wavelength multiplexer is an interference filter.

6. An optical coupler for an optical direct amplifier using stimulated Raman effect in which pump light is wavelength multiplexed with signal light and multiplexed light is applied to a transmission optical fiber for amplification, comprising;

a first polarization prism for multiplexing two linear polarization beams of first wavelength ($\gamma_1$) generated by semiconductor lasers, a second polarization prism for multiplexing two linear polarization beams of second wavelength ($\gamma_2$) which is close to said first wavelength, generated by semiconductor lasers, a first wavelength multiplexer for multiplexing outputs of said first polarization prism and said second polarization prism, a second wavelength multiplexer for multiplexing the output of said first wavelength multiplexer with signal light so that the output of second wavelength multiplexer is applied to a transmission optical fiber, and said first polarization prism, and said second polarization prism are directly coupled with first wavelength multiplexer, which is directly coupled optically with second wavelength multiplexer.

* * * * *